United States Patent [19]

Hoppe et al.

[11] Patent Number: 4,847,356

[45] Date of Patent: * Jul. 11, 1989

[54] TRANSPARENT COPOLYAMIDE FROM BIS(4-AMINO-3,5-DIETHYL CYCLOHEXYL) METHANE

[75] Inventors: Manfred Hoppe, Chur; Hans D. Torre, Domant/Ems, both of Switzerland

[73] Assignee: EMS-Inventa AG, Switzerland

[ * ] Notice: The portion of the term of this patent subsequent to Mar. 15, 2005 has been disclaimed.

[21] Appl. No.: 93,106

[22] Filed: Sep. 1, 1987

Related U.S. Application Data

[63] Continuation of Ser. No. 858,657, May 1, 1986, abandoned, which is a continuation-in-part of Ser. No. 816,805, Jan. 7, 1986, Pat. No. 4,731,421.

[30] Foreign Application Priority Data

Jan. 7, 1985 [CH] Switzerland .............................. 039/85

[51] Int. Cl.$^4$ ............................................. C08G 69/26
[52] U.S. Cl. .................................... 528/346; 525/432; 528/310; 528/324; 528/329.1; 528/338; 528/339; 528/340; 528/347; 528/349

[58] Field of Search ............... 528/346, 349, 324, 310, 528/329.1, 338, 339, 340, 347; 525/432

[56] References Cited

U.S. PATENT DOCUMENTS

| | | | |
|---|---|---|---|
| 4,268,661 | 5/1981 | Schmid et al. | 528/346 |
| 4,293,687 | 10/1981 | Weissel et al. | 528/346 |
| 4,731,421 | 3/1988 | Hoppe et al. | 528/346 |

Primary Examiner—Harold D. Anderson
Attorney, Agent, or Firm—Jordan B. Bierman

[57] ABSTRACT

Transparent copolyamides with very good processibility, very good mechanical properties, excellent transparency and hydrolysis stability in boiling water, and alloyability with other polyamides, are obtained through polycondensation of alkyl derivatives of dicycane and additional polyamide-forming components, together with isophthalic acid and an ω-aminocarboxylic acid or its lactam with more than 8 C-atoms, or salts thereof, or a stoichiometric mixture of an aliphatic dicarboxylic acid and an aliphatic diamine.

The copolyamides of the invention are excellently suitable for the production of molded articles, thanks to their low processing viscosity.

14 Claims, No Drawings

TRANSPARENT COPOLYAMIDE FROM BIS(4-AMINO-3,5-DIETHYL CYCLOHEXYL) METHANE

This application is a continuation of application Ser. No. 858,657, filed May 1, 1986, now abandoned, which is a continuation-in-part of applicants' copending application Ser. No. 816,805 filed Jan. 7, 1986, now U.S. Pat. No. 4,731,421, which claims the foreign priority of Swiss Pat. Application No. 039/85 filed Jan 7, 1985.

Polyamides and copolyamides produced with the use of 3-aminomethyl-3,5,5' trimethylcyclohexylamine (IPD), 4,4'-diaminodicyclohexyl or diamines of dicycane type bis-(4-aminocyclohexyl)alkane, which can be substituted by methyl groups in the cyclohexyl radicals, have long been known.

The polyamides described in GB Pat. No. 619,707 and in U.S. Pat. No. 2,494,563 of 4,4'-diaminodicyclohexyl or of diamines of the dicyane type and with dicarboxylic acids, such as adipic acid or sebacic acid, are transparent, when mixtures of isomers of these diamines, which are liquid at 25° C., are used for their production. However, the processability and other properties of these transparen polyamides, such as stability of transparency in boiling water, resistance to organic solvents, and hydrolysis stability, leave much to be desired.

The transparent polyamide described in U.S. Pat. No. 2,696,482, of mixtures of isomers of 4,4'-diaminodicyclohexylmethane which are liquid at 25° C., and of isophthalic acid, has good stability in hot water. For an advantageous course of the polycondensation, however, it is necessary to start with the diphenyl ester of isophthalic acid or add the same to the polycondensation mixture as solvent or plasticizer. Due to the high fusing temperature and the high fusion viscosity of this transparent polyamide, whose maximum water absorption is 7.75%, processing temperatures of about 330° C. are required. Similar disadvantages are also found in the polyamide of bis-(4-amino-3-methyl-cyclohexyl)-methane and terephthalic acid described in U.S. Pat. No. 2,516,585.

The transparent copolyamides of 4,4'diaminodicyclohexylmethane with terephthalic acid and/or isophthalic acid and of ε-caprolactam described in U.S. Pat. No. 3,847,877, display a similarly high water absorption ability and, upon treatment with boiling water, tend to turbidity after a few days. In addition, they also contain unconverted ε-caprolactam, which restricts or even makes their application impossible in many areas.

The latter also applies to the transparent copolyamides described in the unexamined German patent application No. 1,595,354; i.e. polymers of 2,2-bis(4-aminocyclohexyl)-propane, dicarboxylic acids and ε-caprolactam which are soluble in methanol and polycondensed to contain more than 20% by weight caprolactam and/or another conventional polyamide forming agent, e.g. hexamethylene diammonium adipate. To the extent that the polyamides described in the unexamined German patent application No. 1,595,354, are built up only from 2,2-bis-(4-aminocyclohexyl) propane and a dicarboxylic acid such as adipic acid, they do have a better resistance to solvents, but because of their very high softening point they can be processed only with difficulty, as it is hardly possible to produce stress-free injection molded parts from them.

The transparent copolyamides described in U.S. Pat. No. 3,597,400 of 4,4'-diaminodicyclohexylmethane, hexamethylenediamine, terephthalic acid and isophthalic acid, exhibit much too high a water absorption capacity. Thus, when these transparent copolyamides are stored in water, their softening points drop to 50° to 60° C.

The transparent copolyamides described in U.S. Pat. No. 3,842,045 are polycondensation products of 4,4'-diaminodicyclohexylmethane which is present with 40 to 54% in the trans-trans configuration and contains a mixture of 50–70 mole % decane dicarboxylic acid-1,10 and 30–50 mole % suberic acid or azelaic acid.

Transparent copolyamides of 2,2-bis-(4-aminocyclohexyl)-propane and/or its methyl derivatives and of dicarboxylic acid compounds, which consist to 20–65 mole % of adipic acid and to 35–80 mole % of suberic acid, azelaic acid, sebacic acid and/or decane dicarboxylic acid-1,10, are described in U.S. Pat. No. 3,840,501.

Swiss Pat. No. 449,257 is concerned with transparent copolyamides of decane dicarboxylic acid-1,10 and of diamines of the dicyane type, i.e., bis-(4-amine-3-methylcyclohexyl)-methane or 2,2bis-(4-aminocyclohexyl)-propane.

The flame-resistant thermoplastic molding compounds in the German unexamined patent application No. 2,405,985 contain, in addition to red phosphorus, a transparent polyamide or compounds of two or more transparent polyamides. Mentioned as transparent polyamides are also those derived from 35 mole % 4,4'-diaminodicyclohexylmethane or 2,2'-bis-(4-aminocyclohexyl)-propane, 35 mole % isophthalic acid and 30 mole % ω-aminolauric acid (or its lactams) or from a stoichiometric mixture of dodecamethylene diamine and decane dicarboxylic acid 1,10. The monomer compounds to be used for the production of these polyamides consist of 33 or 31.5% by weight, respectively, of ω-aminolauric acid or of the stoichiometric mixture of dodecamethylene diamine and decane dicarboxylic acid 1,10.

Unexamined German patent application No. 2,936,759 deals with transparent copolyamides with a high glass transition point, in which, to reduce the processing viscosity, 30% by weight or more of an ω-aminocarboxylic acid of at least 11 C-atoms is used and which, besides a diamine of the dicyane type, have a considerable portion of isophorondiamine that can give rise to brittleness and discoloration of the copolyamide.

European Pat. No. 0,012,931 describes transparent copolyamides which are composed, among others, of adipic acid, hexamethylenediamine and a mixture of dicyanes as additional diamine components, and which have sufficient hot water stability.

Finally, the transparent copolyamides set forth in German Pat. No. 2,642,244 and resulting from (ω-aminocarboxylic acid, isoph acid and a methyl derivative of dicyane diamine do not always exhibit a sufficient thermoplastic stability, stress corrosion cracking, tenacity, transparency or hydrolysis stability in boiling water. Additionally, they have a relatively high processing viscosity.

Surprisingly, it was found that, when bis-(4-amino-3,5-diethylcyclohexyl)-methane, bis-(4-amino-3-ethyl-5-methylcyclohexyl)-methane, or bis-(4-amino-3-isopropyl-5-methylcyclohexyl)-methane is used, together with additional specific polyamide-forming components in specific parts, highly transparent copolyamides are obtained. In addition to good processability, they have very good mechanical properties, as well as sufficient transparency and hydrolysis stability in boiling water and which, with other polyamides, e.g., nylon 12, yield transparent plastic alloys.

The tetraethyldiamine derivative of dicycane used for the copolyamide according to the invention is described in detail in the unexamined German patent application Nos. 2,945,614 and 2,502,893. Production is effected by catalytic hydrogenation of the corresponding aniline derivative.

The highly transparent copolyamides according to the invention, as well as the production of same through use of tetraethyl derivatives of dicycane diamine and other polyamide-forming components, are characterized by the polycondensation of (a) bis-(4-amino-3,5-diethyl-cyclohexyl)-methane, bis-(4-amino-3-ethyl-5-methylcyclohexyl)-methane, or bis-(4-amino-3-isopropyl-5- methylcyclohexyl)-methane or their mixtures with bis-(4-amino-3-methylcyclohexyl)-methane, bis-(4-aminocyclohexyl)-methane, 2,2'-bis(4-aminocyclohexyl)-propane or additional substituted diamines of the dicycane type or with the diamines 1,3-bis-amino-methyl-cyclohexane, 3-aminomethyl-3,5,5'-trimethylcyclohexylamine (IPD), trimethylhexamethylenediamine, hexamethylene- and methylpentamethylenediamine, 3,6-diaminomethyl- tricyclodecane, 1,3-diaminomethyl-norbornane, m-xylylenediamine, 5-methylnonane-(1,9)-diamine or similar aliphatic, cycloaliphatic or araliphatic diamines, or with other diamines in selected, reactive isomer distribution (position isomerism) and in a molar ratio of 95:5 to 5:95 with (b) approximately a stoichiometric quantity, relative to the components (a) of isophthalic acid which can be replaced by 0–50 mole or weight percent of terephthalic acid or by 5–100 mole or weight percent additional aliphatic dicarboxylic acids, and with (c) 0 to 80% by weight based on the total of (a), (b) and (c) of an additional polyamide-forming component, which comprises 1. an ω-aminocarboxylic acid or its lactam with more than 8 C-atoms, or
2. a salt or a stoichiometric 1:1 mixture of an aliphatic dicarboxylic acid, in particular an α,ω-polymethylenedicarboxylic acid and an aliphatic diamine, in particular an α,ω-polymethylenediamine. The average number of methylene groups in (c), relative to each amide group or each pair of amide-forming groups is at least 7, and the minimum number of methylene groups between the amide-forming groups is at least 6. In the case of replacement of one part of the isophthalic acid by an aliphatic dicarboxylic acid, the total of the parts by weight of the aliphatic dicarboxylic acid and (c) must be in the range of 0 to 80% by weight, based on the total of (a), (b) and (c).

If several compounds or salt-pairs are used as 1 and 2 above, the average number of methylene groups in (c), relative to each amine group, shall be at least 7. The pairs —$NH_2$ and COOH are to be deemed amide-forming groups. BIS-(4-amino-3,5-diethylcyclohexyl)-methane, bis-(4-amino-3-ethyl-5-methylcyclohexyl)-methane, or bis-(4-amino-3-isopropyl-5-methylcyclohexyl)-methane, bis-(4-amino-3-methyl-cyclohexyl)-methane, bis-(4-amino-cyclohexyl)-methane, 2,2'-bis-(4-aminocyclohexyl)-propane, 2,2'bis-(4-amino-3-methyl-cyclohexyl)-propane and additional cycloaliphatic, aliphatic and araliphatic diamines can be used in the form of common or selected isomer mixtures. Suitable acid components according to (b) are preferably isophthalic acid alone or mixtures of isophthalic and terephthalic acid, which contain up to 50% (by mole or weight) terephthalic acid or substituted isophthalic acid.

If the isophthalic acid is replaced at a rate of 5–100% by other polyamide-forming dicarboxylic acids, then advantageously those with more than 6 C-atoms are suitable to serve as the dicarboxylic acids, in particular suberic acid, azelaic acid, sebacic acid, decanedicarboxylic acid, undecane- and dodecane-dicarboxylic acids and their homologues substituted in the side chain.

As polyamide-forming component of (c), the following are particularly sutiable: for compounds of 1, ω-aminolauric acid, ω-amino-undecane acid or mixtures thereof; for compounds of 2, salts of α, ω-di-aminoalkane and α, ω-alkanedicarboxylic acids and their homologues substituted in the side chain. In particular, 1,6-diaminohexane, 1,8-diaminooctane, 1,9-diaminononane, 1,10-diaminodecane, 1,12-diaminododecane and their alkyl-substituted homolgues, trimethylhexamethylenediamine and the like; with azelaic acid, sebacic acid, decanedicarboxylic acid, dodecanedicarboxylic acid and homologues substituted in the side chain.

For compounds of 1, the equivalent weight is identical with the molecular weight. For salts or stoichiometric mixtures of diamine and dicarboxylic acids of 2, it is half the sum of the weight of the dicarboxylic acid and of the diamine.

The starting materials used in the copolyamides according to the invention are well suited for the polycondensation in the melt; they are temperature-stable and evidence virtually no tendency to discoloration during the polycondensation, even when temperatures of up to 330° C. are used.

The copolyamides produced according to the invention exhibit glass transition temperatures of about 110° to about 180° C. and high thermoplastic stability. They also display excellent viscosity, transparency and hydrolysis stability in boiling water for several weeks, as well as very good processing viscosity.

It is particularly advantageous to adjust the supplementary quantity (c) in such a manner that the glass transition temperatures ($T_G$) are within the range of 140°–180° C.; when the supplementary quantity is reduced, the glass transition temperature is raised and vice versa.

Compared with the copolyamides according to the teachings of U.S. Pat. Nos. 3,842,045 and 3,840,501 and unexamined German patent application No. 2,405,985, the copolyamides produced according to the invention are distinguished by a higher stability of the transparency in boiling water.

Compared with the copolyamides described in the unexamined German patent application No. 2,642,244, the types of polyamides of the invention have a higher thermoplastic stability, less stress corrosion cracking in alcoholic solvents, higher viscosity, lower processing viscosity, and in addition, better transparency and hydrolysis stability in boiling water.

The melt viscosity of the copolyamides according to the invention at 270° C. and at a load of 122.6N is less than 2000 Pa.'s which ensures faultless processability in the manufacture of molded articles.

Generally known polycondensation methods are used in the production of the copolyamides of the invention. The diamine and the dicarboxylic acids should present in equivalent quantities, so that copolyamides with the required molecular weights are obtained. Appropriately selected excess quantities, often of diamine—but also of dicarboxylic acid—permit the chain length of the copolyamides to be controlled. The chain length can also be restricted by adding monoamines or monocarboxylic acids to the reaction mixture. The components pursuant to (a) and(b) can be used as such or also as salts.

ω-aminoundecane acid is added as component 1 directly to the reaction mixture while, in place of ω-aminolauric acid, its lactam (lauric lactam), is often used. However, this requires that a pressure phase in the presence of water be included before the actual polycondensation to split the lactam ring.

If a dicarboxylic acid and a diamine are used for component 2, then acid and amine can be added individually or in the form of their salt. Salts of straight-chain α, ω-dicarboxylic acids and α, ω-diamines can be produced relatively easily. No stoichiometry problems arise when they are used.

In the condensation of the diamines according to (a) with isophthalic acid, with a mixture of isophthalic acid and terephthalic acid, or an aliphatic dicarboxylic acid and with lauric lactam, the mixture of the starting materials, which still contain water, is first subjected to a pressure treatment at elevated temperature. The pressure is subsequently reduced and the water is drawn off during the polycondensation under either inert gas (usually nitrogen) or vacuum.

When diamines and dicarboxylic acids are added individually, the neutralization reaction takes place preferably in the presence of a small amount of water at temperatures at which a stirrable mixture or melt is obtained, whereupon the temperatures are gradually increased. To prevent any loss of amines, precondensation can take place in closed systems under pressure; after reduction of pressure, polycondensation can be continued without pressure or in a vacuum.

Before, during or towards the end of the polycondensation, the additives customary in the production of polyamides can be added to the polycondensation mixture; because of the transparency, they should preferably be soluble in the copolyamide. Such additives are typically antioxidants, flame retarding agents, light-stabilizers, thermostabilizers, impact resistance modifiers, plasticizers, mold parting agents, optical brighteners, dyes, and others.

In the event that the transparency of the copolyamides of the invention plays a less important part than their mechanical properties, the aforementioned additives may be correspondingly less soluble in the copolyamide, and additives or fillers with reinforcing action can be used, such as organic and inorganic fibers, pigments, mineral powders, filling materials, and others. These added substances can be admixed to the copolyamide or can also be worked in through remelting in appropriate devices; e.g., in an extruder. The copolyamides of the invention are well suited for the production of a large variety of molded articles, e.g., by the so-called injection molding process or extrusion process. A specific kind of application of the polymers of the present invention by extrusion is, e.g., the wrapping of optical fibers (e.g. glass fibers) in opto-electrical communication systems.

Depending on the fusion viscosity of the granulate used, injection molding temperatures of up to 310° C. and higher can be applied, with only a slight risk of discoloration. The material displays good flow and mold release properties. To obtain better mold filling, the tools can be tempered, whereby mold release and also transparency can be positively influenced. Conventional powdering of the granulate with certain release agents is often unnecessary.

The copolyamides of the invention can also be alloyed and/or mixed with other homo- and/or copolyamides and/or mixtures of same, or with other plastic materials. This can be effected, for example, by mixing the granulates or plastic material parts and carrying out a co-extrusion.

Suitable additive homopolyamides are, for example, PA 12, PA 11, PA 6.9, PA 6.10, nylon 6 or nylon 12. Suitable polyamides are, for example, those which contain monomers which lead to the aforesaid homopolyamides, or other copolyamides; other suitable plastic materials are those which are compatible with the copolyamides of the invention.

The co-components are preferably added in a quantity of 0–50%, based on the resulting alloy. By alloying the copolyamide of the invention with an additional component, its mechanical properties can be modified, for example, the impact resistance and the notch impact strength are thereby generally improved. If a polyamide from among the monomers mentioned under (c) is used as additional component, e.g. nylon 12, then the transparency stability in boiling water is insignificantly affected.

EXAMPLES 1 THROUGH 10 AND COMPARISON RESULTS

In the following Table 1 (Examples 1–10), various polycondensation tests are listed, which have only one diamine component as component (a). As component (a) (column 1) in these and all following examples, bis-(4-amine-3,5-diethyl-cyclohexyl)-methane in the form of a liquid mixture of isomers was used.

In column 2, component (c) is listed; in column 3, the percent by weight of component (c), relative to the sum of the weights of all components (a), (b) and (c) is set forth. Column 4 contains the molar proportion of components (a), (b) and (c). In column 5, the time at which the maximum reaction temperature (column 6) is reached, is shown.

The viscosity $\eta_{rel}$ (column 7) was measured in m-cresol as a 0.5% by weight solution at 20° C. For the $T_G$ measurements (column 8), a DSC 990 instrument of Du Pont was used (R=5/E, S=20° C./min.). The fusion viscosity values in column 9 were measured with a melt index tester Gottfert M/21.6 (nozzle L 8 mm, φ2.1 mm) at 270° C. and with a load of 122.6N.

For the measurement of the transparency stability in boiling water (column 10), pellets made of the copolyamide were tested in boiling water. The meanings are: very good=transparency stability of several weeks, good=transparency stability of about 3 days, average=transparency stability of about 1 day, and bad=transparency stability of only a few hours or less.

In column 11, the bending-E-moduli of Klein-DIN-beams according to DIN 53,452 are indicated, which were produced on a laboratory injection molding machine. Column 12 contains data on stress cracking stability of test bars (127×12.7×3.2) in 100% ethanol: the numbers represent the edge-fiber tension in N/mm² after 90 sec. immersion time.

In tests 8 and 9, the component (b), namely isophthalic acid, was replaced by 38 and 25% by weight, respectively, of terephthalic acid. In test 10, 1,10-decanedicarboxylic acid has been used in place of isophthalic acid.

The components were weighed in in a 2-liter condensation device of steel, which was carefully rinsed with nitrogen before and after filling. Under good agitation of the mixture of starting materials and under nitrogen, the device was carefully heated to 200° C. Precondensation started and the main quantity of reaction water was distilled off; the melt thereby became increasingly viscous. The temperature was then raised gradually and, after another hour, it reached 280°–300° C. After a total condensation of 4–8 hours, the pressure was released and the melt was finally drawn off through a bottom blow valve into a cold water bath. The solidified strands were crushed into granules by means of a crushing machine and they were subsequently dried in a vacuum.

The comparison examples I and II in Table 1 were carried out in accordance with the teachings of German Pat. No. 2,642,444. According to both examples, copolyamides are formed with higher fusion viscosities, lower bending-E-modules and lower stress cracking ability than with the tests run with the copolyamides of the present invention.

EXAMPLES 11 THROUGH 20 (TABLE 2)

In Table 2 tests are reported in which component (a), besides bis-(4-amino-3,5-diethyl-cyclohexyl)-methane, contains a second diamine (column 2), either from the dicycane series such as bis-(4-amino-cyclohexyl)-methane, bis-(4-amino-3-methyl-cyclohexyl)-methane, bis-(4-aminocyclohexyl)-propane and other diamines, or those which exhibit a certain steric asymmetry, such as 3-aminomethyl-3,5,5'-trimethylcyclohexane (IPD), 1,3-bis-(aminomethyl)-cyclohexane, 1,3-xylylenediamine, 3,6-diaminomethyl-tricyclodecane (TCD), 1,3-diaminomethylnorbornane (DMNB) or trimethylhexamethylenediamine.

The molar proportion of the two diamines is shown in column 3. In column 4, the molar proportion of components (a), (b), (c) is listed isophthalic acid always being used as component (b), and ω-aminolauric acid always being used as component (c).

TABLE 1

| | | Column | | | |
|---|---|---|---|---|---|
| 1 | 2 | 3 | 4 | 5 | 6 |
| | | | | Polycondensation conditions | |
| Example No. | Component (c) | % by weight Component (c) | Equivalent proportion (a):(b):(c) | Time (hrs.) | Max. Reaction temperature |
| 1 | ω-aminolauric acid | 29 | 1:1:1.1 | 5.5 | 290° C. |
| 2 | ω-aminoundecane acid | 29.3 | 1:0.9:1 | 6 | 285° C. |
| 3 | 9.12 salt | 45 | 1:0.95:1 | 5.5 | 285° C. |
| 4 | 10.12 salt | 40 | 1:0.92:1 | 5 | 285° C. |
| 5 | ω-aminolauric acid | 32 | 1:1:1 | 8 | 280° C. |
| 6 | ω-aminolauric acid | 33 | 1:0.98:1.1 | 5.5 | 280° C. |
| 7 | ω-aminolauric acid | 30.5 | 1:0.95:1 | 6.5 | 285° C. |
| 8 | ω-aminolauric acid | 30.7 | 1:0.9:1 (62/38) | 7 | 285° C. |
| 9 | ω-aminolauric acid | 30.7 | 1:0.9:1 (75/25) | 7 | 285° C. |
| 10 | ω-aminolauric acid | 28.6 | 1:0.95:1 | 5.5 | 285° C. |
| Compar. Example I | ω-aminolauric acid | 36.5 | 1:1:1 | 5.5 | 285° C. |
| Compar. Example II | ω-aminolauric acid | 33.8 | 1:0.99:1.05 | 4.5 | 285° C. |

| | | Column | | | |
|---|---|---|---|---|---|
| | 7 | 8 | 9 | 10 | 11 | 12 |
| | | | PROPERTIES | | | Crack |
| Example No. | ηrel. (0.5% m-cresol) | $T_G$ (°C.) | Fusion viscosity Pa.s | Transparency in boiling water | Bending E-modulus (*) | formation starting at N/mm² (**) |
| 1 | 1.41 | 159 | 847 | very good | 2620 | >14 |
| 2 | 1.30 | 148 | 910 | good | 2380 | >11 |
| 3 | 1.53 | 120 | 1030 | very good | 2410 | >11 |
| 4 | 1.48 | 131 | — | very good | 1910 | >8 |
| 5 | 1.45 | 146 | 1094 | very good | 2460 | >12 |
| 6 | 1.39 | 153 | 496 | good | 1827 | >13 |
| 7 | 1.42 | 157 | 640 | very good | 2638 | >11 |
| 8 | 1.34 | 150 | 176 | good | 2460 | >12 |
| 9 | 1.36 | 148 | 496 | good | 2295 | >12 |
| 10 | 1.38 | 105 | 620 | good | 1944 | — |
| Compar. Example I | 1.68 | 156 | 2146 | good | 1632 | >2.5 |
| Compar. Example II | 1.52 | 154 | 1900 | good | 1816 | >4 |

(*) = DIN 53,452
(**) = Edge-fiber tension in 100% ethanol

TABLE 2

| Example No. | Type of the second diamine in component (b) | Molar proportion of the two diamines in component (b) | Equivalent proportion of the components (a):(b):(c) | $\eta$rel. (0.5% m-cresol) | $T_G$ (°C.) | Fusion viscosity (270° C., 1226. N atro) Pa.s | Transparency in boiling water |
|---|---|---|---|---|---|---|---|
| 11 | Bis-(4-amino-cyclohexyl)-methane | 50:50 | 1:0.95:1 | 1.51 | 148 | 1859 | very good |
| 12 | Bis-(4-amino-cyclohexyl)-methane | 70:30 | 1:0.97:1 | 1.40 | 149 | 990 | very good |
| 13 | Bis-(4-amino-3-methyl-cyclohexyl)-methane | 50:50 | 1:0.98:0.92 | 1.43 | 158 | 1404 | very good |
| 14 | Bis-(4-amino-cyclohexyl)-propane | 50:50 | 1:0.92:1 | 1.38 | 152 | 578 | very good |
| 15 | IPD (3-aminomethyl-3,5,5'-trimethylcyclohexane) | 50:50 | 1:0.92:1 | 1.41 | 144 | 550 | good |
| 16 | 1,3-bis-aminomethylcyclohexane | 50:50 | 1:0.92:1 | 1.39 | 125 | 176 | very good |
| 17 | 1,3-xylilenediamine | 50:50 | 1:0.92:1 | 1.44 | 120 | 640 | good |
| 18 | Diaminotricyclodecane | 50:50 | 1:0.92:1 | 1.44 | 137 | 475 | good |
| 19 | Diaminomethylnorbornane | 50:50 | 1:0.92:1 | 1.38 | 134 | 248 | good |
| 20 | Trimethylhexamethylene-diamine | 50:50 | 1:0.92:1 | 1.42 | 113 | 217 | average |

EXAMPLES 21 AND COMPARISON EXAMPLES 3 THROUGH 6 (TABLE 3)

Example 21 is a further example of a copolyamide according to the invention; a pellet thereof exhibits excellent transparency stability in boiling water.

In comparison example 3, according to the teachings of unexamined German patent application No. 2,405,985, 4,4'diaminodicyclohexylmethane, isophthalic acid with a content of 5 mole % terephthalic acid, and ω-aminolauric acid were used in a molar proportion of 1:1:1.1, respectively.

In comparison example 4, according to unexamined German patent application No. 1,595,354, 2,2'-bis-(4-aminocyclohexyl)-propane, an equivalent quantity of isophthalic acid (which contained 5 mole % terephthalic acid), as well as 24.8% by weight caprolactam, relative to the sum of all components, were used. In comparison example 5, also according to the teachings of unexamined German patent application No. 1,595,354, the same components were used, but the amount of caprolactam, relative to the total by weight of all the reactants, was 34% by weight.

In comparison example 6, according to the teachings of U.S. Pat. No. 3,847,877, the test was started with 4,4'-diaminodicycohexylmethane, an equimolar quantity of isophthalic acid (which contained 5 mole % terephthalic acid), and 32.4% by weight caprolactam.

EXAMPLE 22

This example is intended to demonstrate the feasibility of producing the copolyamide of the invention on a semi-commercial scale.

In a V4A polycondensation autoclave, 18.3 kg of the liquid mixture of isomers of bis-(4-amino-3,4-diethylcyclohexyl)-methane and 11.5 kg laurinlactam are placed together with 100 g benzoic acid, 8 g hypophosphorous acid, 10 g silicon-based antifoaming agent, 10 kg water and finally, 9 kg isophthalic acid. The autoclave was rinsed several times with nitrogen and, after being closed, was gradually heated to 180° C., providing a clear melt. Agitation at about 100 rpm followed and the temperature was raised to 285° C. A pressure of about 20 bar developed in the autoclave, which was maintained for 2 hours. The pressure was then reduced to atmospheric pressure and the melt was further condensed under a nitrogen flow at 285° C. for 4.5 hours. Finally, the melt was removed from the autoclave as a strand and crushed to a granulate. After drying, it had 37 μequiv./g carboxyl and 11 μequiv./g amine, a η rel of 1.44, fusion viscosity of 1074 Pa's (270° C., 122.6N) and a $T_G$ of 157° C.

Klein-DIN-beams and DIN-tensile bars were extruded in an injection molding machine at a mass temperature of 290° C. and a series of mechanical properties were measured for the beams and bars.

During the determination of the impact resistance according to DIN 53,453, there was no break of the test piece, the ultimate flexural strength according to DIN

TABLE 3

| | Condensation conditions | | Property values (dry) | | | |
|---|---|---|---|---|---|---|
| | Time (hrs.) | Max. temp. | rel. (0.5% m-cresol) | $T_G$ °C. | Fusion viscosity., (Pa.s) 170° C., 122.6 N | Transparency in boiling water |
| Example 21 | 6.0 | 280° C. | 1.51 | 158 | 1132 | very good |
| Comparison example 3 | 6.3 | 280° C. | 1.63 | 143 | 700 | average |
| Comparison example 4 | 5.0 | 280° C. | 1.53 | 189 | 3000 | good |
| Comparison example 5 | 5.5 | 280° C. | 1.50 | 150 | 1100 | bad |
| Comparison example 6 | 5.5 | 280° C. | 1.51 | 147 | 1700 | bad |

53,452 was 130N/mm², and the bending-E-modulus was 2515N/mm². A tensile bar exhibited very good hydrolysis and transparency behavior in boiling water and a stress cracking stability of more than 15N/mm² after 90 seconds immersion in 100% ethanol. The equilibrium water absorption at 23° C. (50% air humidity) was about 1.3%. The dimension stability of extrusion-molded articles of the copolyamide of the invention was very good. Granular specimens of this batch were co-extruded with 25 and 30% by weight polyamide-12 flakes; the extrudates obtained were fully transparent and had $T_G$ values of 96° and 88° C.

What we claim is:

1. A copolyamide from the polycondensation of
   (a) bis-(4-amino-3,5-diethylcyclohexyl) methane, bis-(4-amino-3-ethyl-5-methylcyclohexyl)-methane, or bis-(4-amino-3-isopropyl-5-methylcyclohexyl)-methane, or dicarboxylic acid salts thereof, with
   (b) a substantially stoichiometric quantity, based on (a), of isophthalic acid or a salt thereof, partially replaceable by 0–50% (by mole or weight) terephthalic acid or a salt thereof, or by 5 to 100% by weight of an additional polyamide-forming aliphatic dicarboxylic acid or a salt thereof, and with
   (c) 20 to 60% by weight, based on the total of (a), (b) and (c) of at least one polyamide-forming component comprising
      1. an ω-aminocarboxylic acid having more than 8 carbon atoms or the lactam thereof, or
      2. a salt or stoichiometric mixture of an aliphatic dicarboxylic acid and an aliphatic diamine,
   the average number of methylene groups in (c), based on each amide group or each pair of amide-forming groups, is at least seven, and the minimum number of methylene groups between the amide-forming groups is at least 6 and, when part of said isophthalic acid is replaced by said aliphatic dicarboxylic acid, the total weight of said dicarboxylic acid and (c) is 20 to 60% by weight based on the total of (a), (b), and (c).

2. The copolyamide of claim 1 wherein (a) further comprises at least one member selected from the group of bis-(4-amino-cyclohexyl)-methane or a diamine, the molar ratio of said diethylcyclohexylmethane to said bis-(4-amino-cyclohexyl)-methane or said diamine being 95:5 to 5:95.

3. The copolyamide of claim 2 wherein said bis-(4-amino-cyclohexyl)-methane is bis-(4-amino-3-methylcyclohexyl)-methane, bis-(4-aminocyclohexyl)methane (dicycane), or 2,2'bis-(4-aminocyclohexyl)-propane and said diamine is 1,3-bis-(aminomethyl)-cyclohexane, 3-aminomethyl-3,5,5'-trimethylcyclohexylamine(IPD), trimethylhexamethylenediamine, hexamethylenediamine, methylpentamethylenediamine, 3,6-diaminomethyl-tricyclodecane, 1,3-diamino-methylnorbornane, m-xylylene diamine, or 5-methylnonane-(1,9)-diamine.

4. The copolyamide of claim 1 wherein 2 is a mixture of α,ω-polymethylene dicarboxylic acid and α,ω-polymethylenediamine.

5. The copolyamide of claim 1 wherein said additional polyamide-forming dicarboxylic acid has more than 6 carbon atoms.

6. The copolyamide of claim 5 wherein said additional polyamide-forming dicarboxylic acid is suberic acid, azelaic acid, sebacic acid, decanedicarboxylic acid, undecane- or dodecane-dicarboxylic acids or their homologs substituted in the side chain.

7. The copolyamide of claim 1 wherein 1 is ω-aminolauric acid, ω-aminoundecane acid, lauric lactam, or mixtures thereof.

8. The copolyamide of claim 1 wherein 2 is a salt of α,ω-diaminoalkane and α,ω-alkanodicarboxylic acids or their homologs substituted in the side chain.

9. The copolyamides of claim 8 wherein 2 is a salt of 1,6-diaminohexane; 1,8-diaminooctane, 1,9-diaminononane; 1,10-diaminodecane, 1,12-diaminododecane, or alkyl substituted homologs thereof, or trimethylhexamethylenediamine with azelaic acid, sebacic acid, decanedicarboxylic acid, dodecanedicarboxylic acid or homologs thereof substituted in the side chain.

10. The copolyamide of claim 1 having glass transition temperatures (Tg) from 140° to 180° C.

11. The copolyamide of claim 1 further comprising nylon 6, nylon 6,6, polyamide 6.9, polyamide 6.10, polyamide 11, polyamide 12 or mixtures thereof.

12. The copolyamide of claim 1 wherein (a) comprises bis(4-amino-3,5-diethylcyclohexyl)-methane or salts thereof.

13. The copolyamide of claim 1 wherein (a) comprises bis(4-amino-3-ethyl-5-methylcyclohexyl)-methane or salts thereof.

14. The copolyamide of claim 1 wherein (a) comprises bis(4-amino-3-isopropyl-5-methylcyclohexyl)-methane or salts thereof.

* * * * *